Feb. 2, 1932.  J. R. HOGE  1,843,129
GLASSWARE FORMING MACHINE
Filed Sept. 12, 1929    6 Sheets-Sheet 1

Inventor
John Ralph Hoge
By
J. F. Rule.
Attorney

Patented Feb. 2, 1932

1,843,129

UNITED STATES PATENT OFFICE

JOHN RALPH HOGE, OF TOLEDO, OHIO, ASSIGNOR TO OWENS-ILLINOIS GLASS COMPANY, OF TOLEDO, OHIO, A CORPORATION OF OHIO

GLASSWARE FORMING MACHINE

Application filed September 12, 1929. Serial No. 392,197.

My invention relates to improvements in glassware forming machines and more particularly to means for transferring bare blanks or parisons from blank molds to finishing molds.

In glassware forming machines of the type with which my invention is particularly adapted for use, the blank and finishing molds are arranged on separate tables side by side and rotated continuously about vertical axes in the same or opposite directions. Rotation of the blank mold table carries the molds in succession past charge gathering and blank transfer stations, the latter located between the two tables.

An object of my invention is to provide an improved type of transfer mechanism capable of transferring blanks without distorting them, from the blank molds to the finishing molds, irrespective of the direction of rotation of the mold tables and without interfering with normal operation of the machine.

Another object is to provide an improved blank transfer mechanism by which blanks or parisons are moved in the arc of travel of the finishing molds at the transfer station during removal of the blanks from the body blank and neck molds and while the finishing molds are closing around the blanks or parisons.

A further object is to provide a novel blank transfer mechanism, whereby the available period of time for effecting transfer of blanks from the blank to the finishing molds is considerably greater than in the average machine.

A still further object is to provide a glassware forming machine in which the neck mold of each charge gathering unit may function as a blank transfer device and in which the neck mold moves in a path coincident with the path of travel of a finishing mold during transfer of a blank or parison to the latter mold.

Other objects will be apparent hereinafter.

In more or less general terms, the invention consists in the provision of blank transfer mechanism by which blanks or parisons may be transferred from a continuously moving body blank mold to a continuously moving finishing mold, said molds being arranged on separate tables in substantially the same horizontal plane and moving in approximately the same or opposite directions at the transfer station. The transfer mechanism includes means to move a neck mold, and with it a blank or parison suspended therefrom, laterally beyond the path of travel of the body blank mold to a position in which the blank may be enclosed in a finishing mold, said neck mold and blank then moving along the path of and with the finishing mold until the transfer operation is complete. Through the use of the present invention, the available period of time for transferring blanks from a continuously moving body blank mold to a continuously moving finishing mold is considerably enlarged so that hurried opening and closing of the molds during the transfer operation is unnecessary. This feature avoids excessive wear and strain on cams and various operating mechanisms, such as results where the blank transfer operation must be effected in a relatively short period of time.

Figure 1:
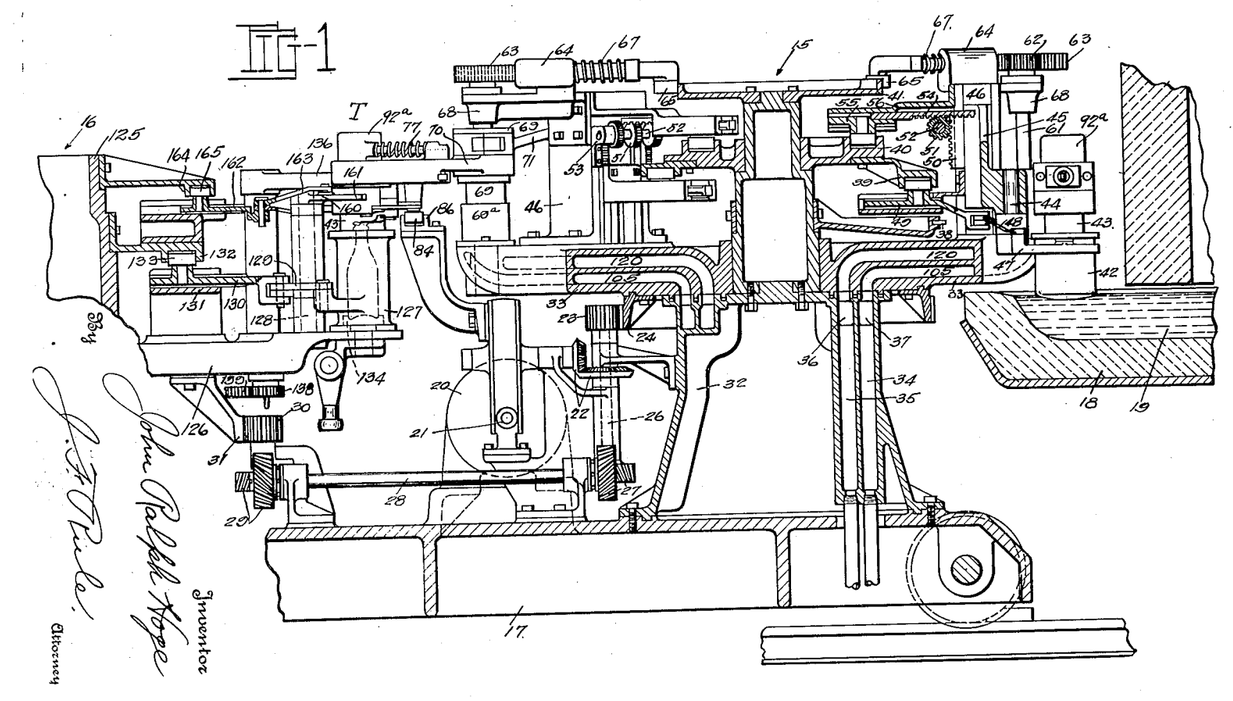
Fig. 1 is a sectional elevation view illustrating one embodiment of my invention.

The machine embodying my invention, comprises continuously rotating blank mold and finishing mold tables 15 and 16 respectively, arranged side by side and mounted upon a wheeled base 17, the latter providing means whereby the entire machine may be moved relative to the receptacle 18 which contains a supply body of molten glass 19, from which mold charges are gathered at regular time intervals. These mold tables 15 and 16 are rotated about vertical axes in order that the molds on the blank mold table 15 may be successively brought to charging position over the tank 18, and for the further purpose of bringing said molds one at a time to a position adjacent the molds on the finishing mold table 16, so that the blanks or parisons may be transferred to the latter molds and later discharged as finished articles at an ejecting station. Rotation of the mold tables is accomplished by a motor 20 (Fig. 1) mounted on the base 17, and operating through suitable speed reduction gearing 21 and meshing bevel gears 22 to rotate a pinion 23, which runs in mesh with a ring gear 24, the latter being rigidly connected to the lower side of the blank mold carriage 33. These bevel gears 22 have driving connection to a vertical shaft 26, which operates through spiral gears 27 to rotate a horizontal shaft 28, which is connected through spiral gears 29 and a pinion 30 to a ring gear 31 carried by the finishing mold table. The motor 20 may be, and preferably is, of the variable speed type, so that the speed of rotation of the mold tables may be varied to meet different operating conditions.

The blank mold table 15 is composed of a central stationary column 32 rising vertically from and suitably secured to the base 17 and constructed to support a rotary mold carriage 33 substantially midway its height.

Air and vacuum passageways 34 and 35, respectively, (Fig. 1), are formed in the central column 32 and lead upwardly into annular chambers 36 and 37 which are at all times in direct communication with an annular series of radially extending passageways formed in the mold carriage 33 or spider and referred to hereinafter. This central column also supports a vacuum control cam 38 (Figs. 1 and 4) which regulates the exhaust of air from the blank molds during the mold charging operation. Above this vacuum control cam 38 is a series of cams 39, 40 and 41 whose respective functions are to open and close the blank molds, raise and lower the dipping frames which carry the blank molds, and swing the transfer arms about their vertical axes toward and away from transfer positions.

An annular series of blank or parison forming units is carried by the mold carriage 33 (Figs. 1, 2, 3 and 6), each unit including cooperating partible body blank and neck molds 42 and 43 respectively. Each body blank mold is supported on a hinge pin 44 (Fig. 1) carried by a dip slide or frame 45 mounted upon a support including a pair of slideways 46. Mold arms 47 on the body blank mold sections are connected through links 48 to a slide 49 which is moved radially at regular time intervals by the cam 39 for the purpose of alternately opening and closing said mold 42.

The dip slide or frame 45 (Figs. 1 and 2) is raised and lowered periodically while over the supply body of molten glass, such movement being obtained by mechanism including a pair of vertical rack bars 50 secured to the dip slide or frame 45 and running in mesh with a pinion 51 which is oscillated at regular time intervals. This pinion is mounted on a horizontal shaft 52 journaled in bearings 53 on the slideways 46 and meshing with a rack bar 54 which is carried by a slide 55 adapted to be reciprocated radially of the machine by means of the stationary cam 40. Horizontal slideways 56 extending inwardly from the vertical slideways 46 support the slide 55 which actuates the mechanism for alternately raising and lowering the mold carrying dip slide or frame 45.

Figure 3:
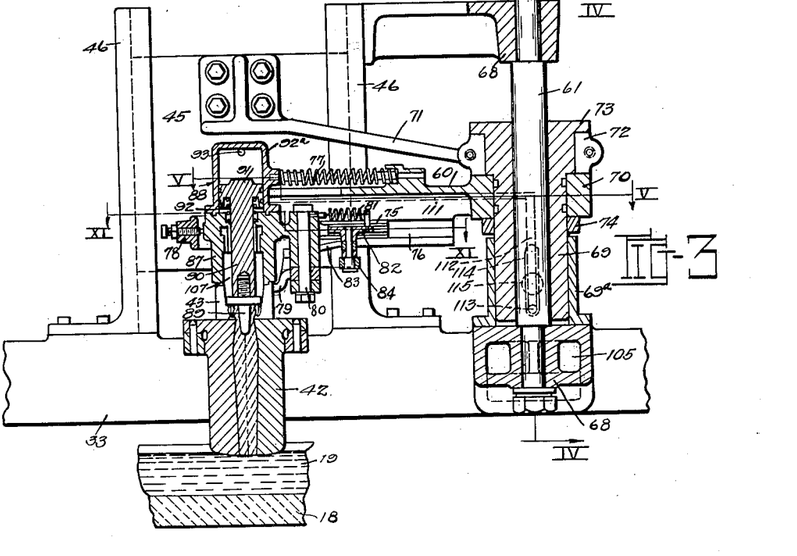
Fig. 3 is a detail vertical sectional view showing the relation between the transfer mechanism and blank mold during gathering of mold charges.
Figure 5:
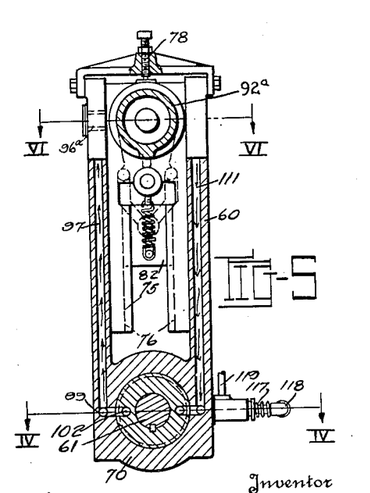
Fig. 5 is a horizontal sectional view taken along the line V—V of Figs. 3 and 4.
Figure 6:
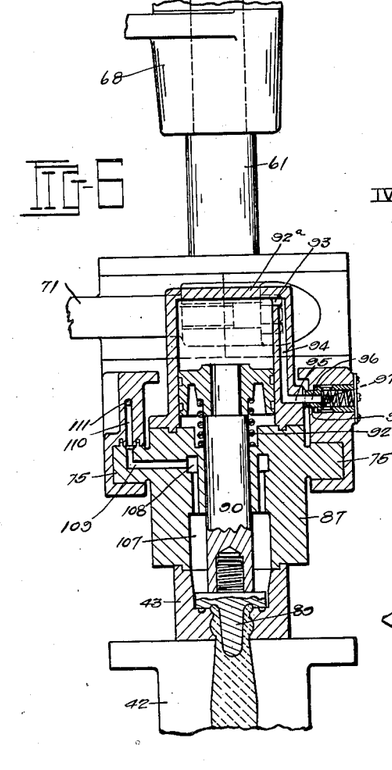
Fig. 6 is a fragmentary sectional view taken along the line VI—VI of Fig. 5, showing plunger control means carried by the transfer arm.

Each neck mold 43 (Figs. 3, 5 and 6)

forms a part of transfer mechanism by which the blanks or parisons are moved laterally from the body blank molds 42 to the finishing molds, hereinafter referred to, for final expansion. Broadly stated, each transfer mechanism includes a transfer arm 60 (Fig. 3) connected at one end to a vertical rock shaft 61 spaced horizontally from one of the body blank molds 42. This transfer arm 60 supports a neck mold 43 and is mounted for horizontal swinging movement about the axis of the rock shaft so that the neck mold may be alternately positioned over the body blank mold 42 and in register with a finishing mold on the adjacent table. Oscillation of the rock shaft 61 (Figs. 1, 2, 3, 4 and 5) for the purpose of swinging the transfer arm 60, is obtained by a cam actuated rack and pinion mechanism at the upper end of said shaft. A pinion 62 secured to the upper end of the rock shaft 61 runs in mesh with a rack bar 63 which is mounted for radial sliding movement in a bearing 64. A cam roll 65 connected to the rack bar 63 rides over the cam 41 heretofore referred to for controlling the swinging movements of the transfer arm. A coil spring 67 encircles the inwardly extended portion of the rack bar and yieldingly holds the cam roll in contact with the face of the cam 41.

The rock shaft 61 whose end portions are journaled in a pair of vertically spaced bearings 68 (Fig. 3) is keyed to a rotary sleeve 69 which in turn is keyed to a collar 70 at the inner end of the transfer arm 60. This connection is such that the sleeve 69 is free to move axially relative to the rock shaft 61 but oscillates with the latter. The rotary sleeve 69 is so mounted in a stationary sleeve 69ᵃ that it may reciprocate and rotate in the latter.

During the gathering of mold charges, the neck and body blank molds 43 and 42, respectively, are positioned as shown in Fig. 3, such position being maintained during vertical movement of the gathering unit while moving over the revolving pot 18. In order that the illustrated relative positions of these molds may be maintained during the charge gathering operation, (Fig. 3), the dip slide 45 is rigidly connected to the sleeve 69 through an arm 71 which carries a collar 72 at its outer end encircling said sleeve 69 beneath a circular flange 73 extending radially from the upper end of said sleeve. A collar or retaining ring 74 is secured to the sleeve 69 just beneath the collar 70 carried by the transfer arm to prevent relative vertical movement between the arm 60 and sleeve 69. Thus, with vertical reciprocation of the dip slide 45, corresponding movement is imparted to the neck mold through the arm 71 and sleeve 69.

Provision is made whereby each neck mold 43 is free to move along a path extending lengthwise of the transfer arm 60 in order that said mold, during the gathering of a mold charge, may register with the body blank mold 42, and during the blank transfer operation may register with the finishing mold and travel in the arc of movement of the latter a predetermined distance for a purpose to be brought out presently. Such relative movement between the neck mold 43 and transfer arm 60 is obtained by mounting said neck mold upon a neck mold slide 75 which is free to move in slideways 76 extending lengthwise of said arm. This slide is yieldingly held at the outer end of the transfer arm by an expansion coil spring 77 (Fig. 3). An adjustable stop 78 is arranged at the outer end of the arm 60 to limit outward movement of the neck mold slide 75 and provides adjustable means for insuring alignment of the neck and body blank molds 43 and 42 respectively.

The neck mold 43 (Fig. 3) is connected through arms 79 to a vertical hinge pin 80 depending from the neck mold slide 75. The neck mold is normally held closed by a coil spring 81 (Fig. 3) arranged to hold a slide 82 in such position that it operates through links 83 connecting the mold arms 79 and slide 82, to hold the sections of the neck mold in contact with each other. A cam roll 84 is mounted on the lower end of an arm 85 depending from the slide 82, and is adapted for engagement with a stationary cam 86 (Figs. 1, 11 and 13) at the blank transfer station. This cam 86 actuates the mechanism just described, as will be apparent hereinafter, and opens the neck mold 43 immediately after the finishing mold is completely closed about a blank or parison. This feature will be referred to again hereinafter.

Figure 4:
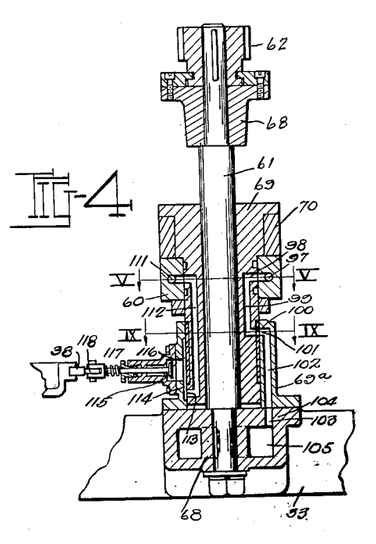
Fig. 4 is a vertical sectional view taken substantially along the line IV—IV of Figs. 3, 5 and 7.
Figure 7:
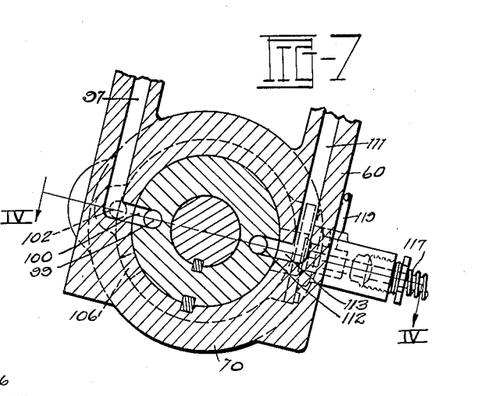
Fig. 7 is a fragmentary sectional view showing the transfer arm in position to cause register of the neck and blank molds, also the air and vacuum passageways and ports in the transfer arm and supporting rock shaft.
Figure 8:
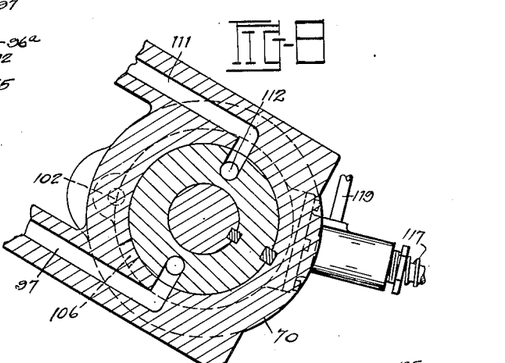
Fig. 8 is a view similar to Fig. 7, showing the transfer arm and shaft in another position.
Figures 9, 10:
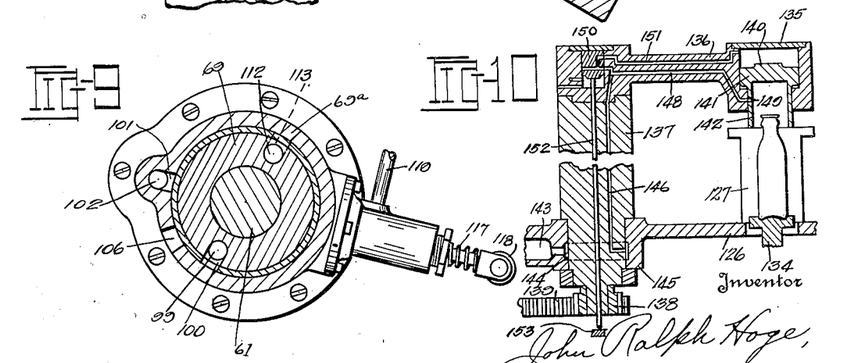
Fig. 9 is a sectional view taken substantially along the line IX—IX of Fig. 4.
Fig. 10 is a vertical sectional view showing the means for finally expanding the blanks or parisons in the finishing molds.
Figures 14, 15:
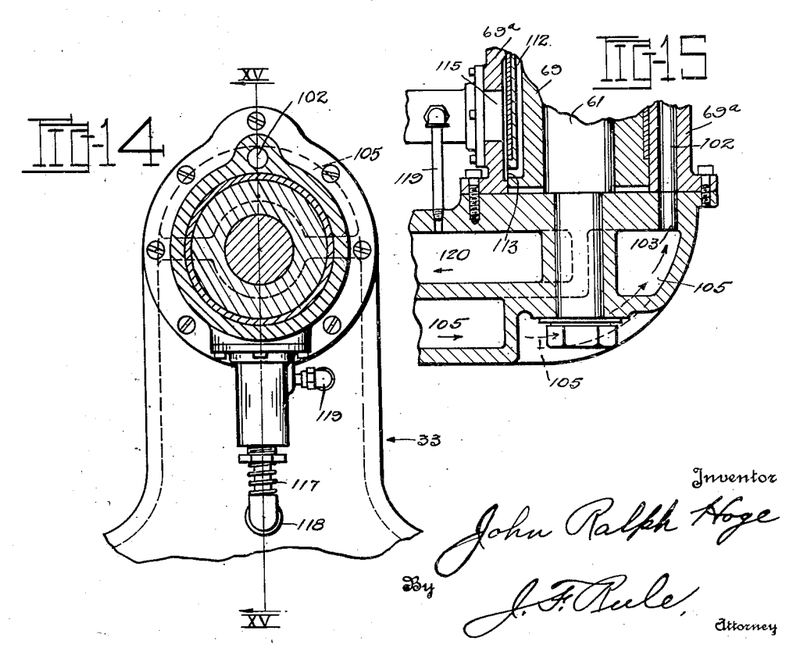
Fig. 14 is a sectional plan view showing the vacuum and air pressure passageways to the transfer arm and the valve control for the vacuum.
Fig. 15 is a sectional view taken along the line XV—XV of Fig. 14.
Figure 16:
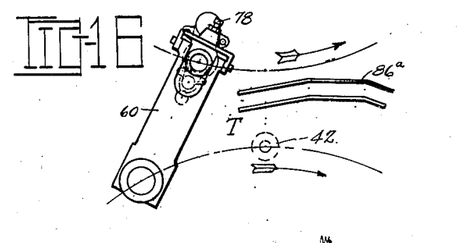
Figs. 16, 17, 18 and 19 are plan views diagrammatically showing the successive movements of the transfer arms during a blank transfer operation where the mold tables rotate in opposite directions.
Figure 17:
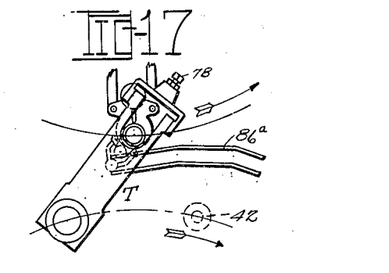
Figure 18:
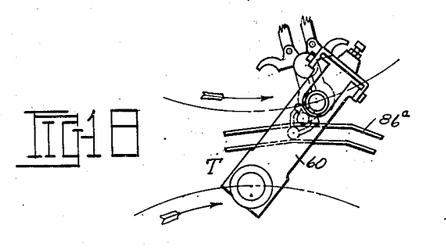
Figure 19:
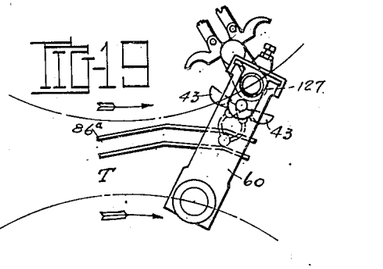

Associated with each neck mold 43 is a plunger mechanism, including a carrier 87 comprising part of the slide 75, and supporting an air motor 88 by which the plunger 89 is moved into the neck mold. A plunger rod 90 (Figs. 3 and 6) is mounted for reciprocation in the carrier 87 and is connected to a piston 91 arranged within the cylinder 92ᵃ of the air motor 88. By reference to Figs. 1, 4, 5, 14 and 15, the means for operating the plunger will be understood. The plunger 89 is yieldingly held in its uppermost position out of the neck mold by a coil spring 92 which encircles the plunger rod 90 just beneath the piston 91. In projecting the plunger into the neck mold, the piston 91 is moved downwardly under pressure of air introduced into the upper end of the motor cylinder 92ᵃ by way of a port 93 in the motor cylinder. Means to supply air under pressure to the motor includes a passageway 94 (Fig. 6) leading downwardly through the cylinder wall from said port and communicating with a lateral port 95 which is normally in register with a port 96 in a spring pressed sealing sleeve 96ᵃ (Figs. 5 and 6) mounted in one side of the transfer arm 60, said port communicating with an air passageway 97 extending lengthwise of said arm. This sleeve snugly contacts with the neck mold slide and prevents or minimizes leakage of air pressure. The inner end of the air passageway 97 (Figs. 4 and 5) communicates through a lateral port 98 with a vertical passageway 99 in the rotary sleeve 69 referred to heretofore. This passageway 99 in the sleeve 69 leads to a lateral port 100 which at times registers with a port 101 communicating with the upper end of a passageway 102 extending lengthwise of the stationary sleeve 69$^a$ which encloses the lower portion of the rotary sleeve 69. A vertical port 103 (Figs. 4 and 15) is formed in the upper wall 104 of the spider 33 and constantly provides communication between the passageway 102 and the annular chamber 37 in the central column 32. While the transfer arm 60 is positioned as shown in Fig. 3 to align the neck and body blank molds, the sleeves 69 and 69$^a$ are positioned with respect to each other, as shown in Fig. 4, so that the passageways 99 and 102 communicate with each other and permit air under pressure to pass into the upper end of the air motor 88 and thereby project the plunger into the neck mold 43, as illustrated in Figs. 3 and 6. Outward swinging movement of the transfer arm shuts off communication between the passageways 99 and 102 and after a predetermined extent of swinging movement brings the passageway 99 into communication with a relief port 106 (Figs. 7, 8 and 9) through which air in the cylinder 92$^a$ and passageways between said cylinder and the port 93 escapes to the atmosphere. The coil spring 92 may now operate to raise the piston 91 and cause retraction of the plunger from the neck mold 43.

While the body blank mold is in contact with the supply body of molten glass 19, air is exhausted from the mold cavity so that a predetermined quantity of molten glass is drawn into the neck and blank mold cavities. Air is exhausted from said molds (Figs. 3 to 9 inclusive) by way of a chamber 107 formed in the lower side of the plunger carrier 87, said chamber communicating with an annular channel 108 into which one end of a substantially L-shaped passageway 109 opens. The other end of this passageway 109 (Fig. 6) opens through the upper side of the neck mold slide 75 and during the period of charge gathering and for a short time thereafter registers with a downwardly opening port 110 communicating with the outer end of a vacuum passageway 111 extending lengthwise of the transfer arm 60. The inner end of this vacuum passageway 111 (Figs. 4 and 8) constantly communicates with a vertical passageway 112 in the rotary sleeve 69. A lateral port 113 at the lower end of the passageway 112 registers with a channel 114 or groove extending vertically on the inner face of the stationary sleeve 69$^a$, said channel at all times communicating with a valved port 115. A valve 116 normally closes the port 115 under influence of a spring 117 and is opened at regular time intervals by the stationary cam 38 referred to heretofore. This cam 38 is arranged adjacent the revolving pot 18 and engages a cam roll 118 to open the valve 116 so that the air may be exhausted from the cavities of the body blank and neck molds.

During gathering of a mold charge (Figs. 1, 3 and 4) the neck mold slide 75 is so positioned that communication is established between the port 110 and vacuum passageway 109 (Fig. 6). Also, the transfer arm 60 is in such position that the port 113 and vertical channel 114 are in register. Upon engagement between the cam 38 and cam roll 118, the valve 116 is opened and air is exhausted from the molds by way of a pipe 119 and a vacuum passageway 120 (Figs. 1 and 15) provided in the upper part of the spider 33, said passageway extending radially of the spider and opening into the annular vacuum chamber 36 in the central column 32.

The finishing mold table 16 (Figs. 1, 2 and 10) includes a stationary central column 125 supporting a rotary mold carriage 126 which carries an annular series of partible finishing molds 127 on its upper side. Each finishing mold is suitably connected to a vertical hinge pin 128, and through links 129 to a slide 130, the latter mounted in slideways 131 for radial reciprocation under influence of a stationary cam 132 which operates through a cam roll 133 on the slide to move the latter. A bottom plate 134 of conventional type is associated with each finishing mold.

A blow head 135 is adapted to be placed over the upper end of the finishing mold 127 upon completion of the blank transfer operation so that air under pressure may be introduced into the blank to expand the latter against the walls of the finishing mold cavity. This is accomplished by providing a horizontally swinging arm 136 (Fig. 10) which is mounted on the upper end of a rock shaft 137 journalled at its lower end in the spider 126 and carrying a pinion 138 below the spider, said pinion adapted to be oscillated at regular time intervals so that the arm 136 may be swung horizontally to thereby bring the blow head into register with the finishing mold. A rack bar 139 engages the pinion 138 and is reciprocated at regular time intervals by suitable mechanism (not shown) to oscillate said pinion. The blow head 135 is mounted on the outer end of the arm 136 and includes an air motor 140 and a vertically reciprocating differential piston 141 from which a sleeve 142 depends. This sleeve 142 is adapted for projection below the motor cylinder at times to enclose the neck or finish of a partially formed bottle and to conduct air under pressure into the upper end thereof. Air under pressure for operating the motor 140 (Fig. 10) and expanding the blanks in the finishing mold is obtained from a supply chamber 143 in the spider, said chamber communicating with an annular channel 144 in the shaft bearing 145 and thence with a vertical passageway 146 which extends lengthwise of the rock shaft 137 to the upper end of the latter where it opens into a chamber 147. A conduit 148 extends lengthwise of the arm 136 from the upper end of the passageway 146, and when the sleeve 142 is in its lowermost position, registers with a port 149 in said sleeve and thereby provides communication between the source of supply of air under pressure and the interior of said sleeve. A valve 150 in the chamber 147 regulates the passage of air under pressure through the conduit 151 in the arm 136 to the motor 140 for the purpose of lowering the piston 140 and sleeve 142. A push rod 152 is connected to the valve 150 and extends lengthwise of and to a point below the rock shaft for engagement with a cam 153 at regular time intervals. When the valve 150 is in its uppermost position (Fig. 10), air under pressure is applied to the upper side of the piston 141 causing downward movement of the latter and seating of the sleeve upon the finishing mold 127. Incidentally, such seating of the sleeve on the finishing mold brings the port 149 into register with one end of the passageway 148, allowing air under pressure to flow into the interior of the sleeve and thence into the upper end of the partially formed article.

Each finishing mold unit includes a neck mold centering device by means of which the neck mold 43 forming part of the blank transfer mechanism, is accurately centered over a finishing mold during transfer of a blank or parison to the latter. The centering device (Figs. 1, 11, 12 and 13) comprises a pair of arms 160 pivoted to the upper end of the finishing mold hinge pin 128 and provided at their outer ends with curved fingers 161 or grippers adapted at times to firmly grip the neck mold. These arms are actuated at regular time intervals by cam mechanism including a slide 162 connected at one end through links 163 to said arms and at its other end to a stationary continuous cam 164 through the medium of a cam roll 165. This cam 164 reciprocates the slide radially of the table and thereby actuates the arms 160 which carry the grippers or jaws.

In operation, the two mold tables 15 and 16 are rotated continuously in the same direction with the result that the body blank and finishing molds are moving substantially in opposite directions at the blanks transfer station "T". As the blank mold units pass over the supply body of molten glass 19, the cam 40 operates to cause contact between the body blank molds and the glass for the purpose of gathering mold charges. These charges are separated from the supply body by cut-off mechanism "C" (Fig. 2) which is operated at regular time intervals. During this mold charging operation and for a predetermined period of time thereafter, the neck molds 43 are in register with their respctive body blank molds 42. As the blank forming units approach the transfer station "T" (Fig. 2), the body blank molds 42 are opened leaving the bare blanks or parisons suspended from the neck molds 43. The cam 41 which controls outward swinging movement of the transfer arms 60 (Fig. 2) is so shaped on the side adjacent the transfer station "T" that the rack bars 63 may move radially inward under influence of the coil springs 67, and through the pinions 62 and rock shafts 61, move the arms to the successive positions illustrated in Figs. 11, 12 and 13.

Figures 11, 12, 13:
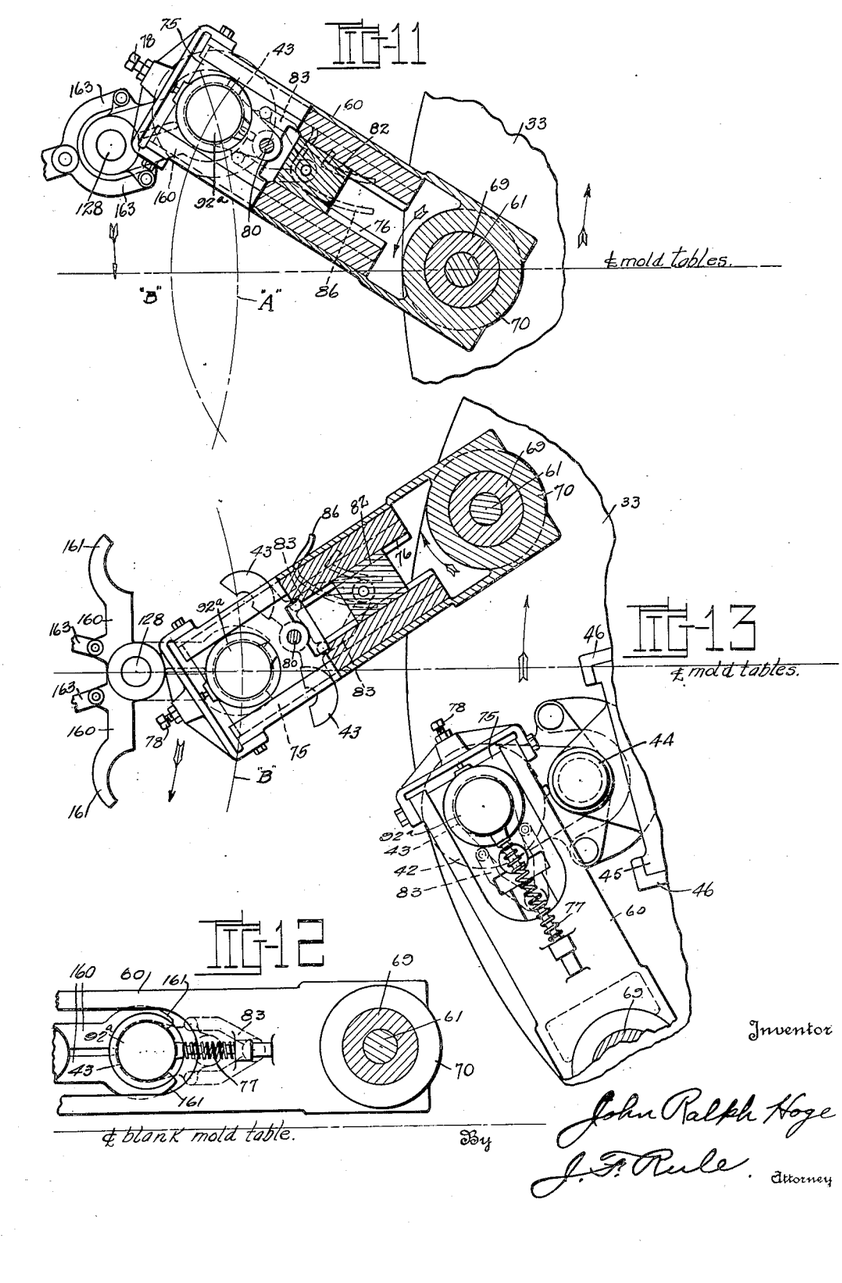
Fig. 11 is a fragmentary sectional plan view taken substantially along the line XI—XI of Fig. 3, showing the transfer arm swung outwardly to cause register of the neck mold with a finishing mold at the start of the blank transfer operation.
Fig. 12 is a sectional plan view showing the position of the transfer arm with respect to the center line between the mold tables, when the blank transfer operation is approximately one-half completed.
Fig. 13 is a plan view with parts in section showing the position of the arm upon completion of the transfer operation; an adjacent arm being shown holding a neck mold in register with a body blank mold just prior to arrival thereof at the transfer station.

Considering a single blank mold unit for the purpose of setting forth the various movements occurring during transfer of blanks or parisons to the finishing molds, rotation of the blank mold table in a clockwise direction brings a mold group to a position in which the cam roll 65, forming part of the mechanism for swinging the transfer arm 60, engages the angular portion 170 of the cam 41 (Fig. 2) so that the rack bar 63 will move radially inward under influence of the coil spring 67. This results in outward swinging of the arm 60 while the blank mold table continues to rotate and so positions the arm that the neck mold 43 is brought over and into register with one of the finishing molds 127. In order to insure accurate alignment of the neck and finishing molds, the centering device heretofore referred to as including the arms 160 and grippers 161 (Figs. 1, 11, 12 and 13) is engaged with the neck mold 43 for the purpose stated. Continued rotary movement of the blank mold table carries the cam roll 65 to another inwardly offset angular portion 171 so that the transfer arm 60 is given an additional outward swing which carries it past a radial center line drawn between the axes of the mold table 15 and rock shaft 61 which supports said arm 60. Referring to Figs. 11, 12 and 13, the transfer arm 60 is shown in the several positions occupied during the blank transfer operation. In Fig. 11, the neck mold 43 is over and in register with the finishing mold 127, the path of travel of the latter being indicated by the dot and dash line "A". In order that the neck mold 43 may follow this path and therefore move with the finishing mold instead of in the arc "B", provision is made, as heretofore described, whereby the neck mold is free to move lengthwise of the transfer arm 60. As the mold tables rotate and the distance between the center of a finishing mold 127 and fulcrum point of a transfer arm shortens, the neck mold 43 is moved lengthwise of the transfer arm 60 against the pressure of the coil spring 77. Thus the neck mold is free to move in the arc of the finishing mold at the transfer station so that the blank transfer operation may be satisfactorily effected.

After swinging of the transfer arm 60 and register of the neck mold 43 with the finishing mold, mechanism heretofore described operates to close the finishing mold about the blank or parison, after which the centering device is removed from engagement with the neck mold 43 and the latter is opened. At this point, the cam roll 65 (Fig. 2) moves out of the angular portion 171 and gradually returns to the high portion of the cam 41 for the purpose of returning the transfer arm 60 to its innermost position wherein the neck mold 43 again occupies a position over and in register with a body blank mold 42. Upon completion of the blank transfer operation, the blow head 135 is brought into position over the upper end of the finishing mold and air under pressure is applied therethrough to the interior of the blank or parison for the purpose of expanding the latter against the walls of the finishing mold cavity.

Figure 2:
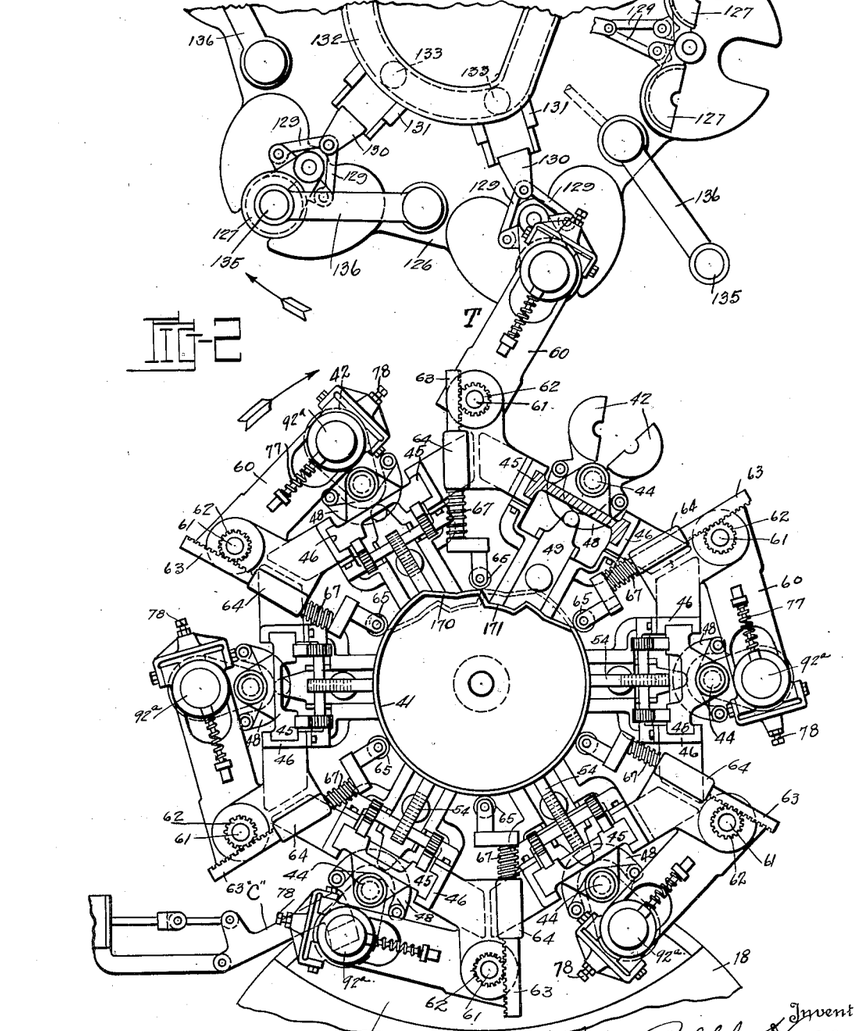
Fig. 2 is a sectional plan view thereof.

In machines wherein the mold tables rotate in opposite directions (Figs. 16, 17, 18 and 19) and the molds on said tables move in substantially the same direction at the blank transfer station "T", the cam 41 which actuates the mechanism for swinging the transfer arm 60 includes angularly offset portions substantially as indicated in dotted lines in Fig. 2. Such location of the offset portions in the cam 41 advances the point at which the transfer arm 60 is swung outwardly for the purpose of bringing the neck mold 43 into register with one of the finishing molds 127. Upon complete closing of the finishing mold about the blank, the cam 86ª (Figs. 16 to 19, inclusive) operates to open the neck molds so that the transfer arm may be returned to its original position wherein the neck mold 43 is in register with the corresponding body blank mold 42.

From the above, it is apparent that this blank transfer device is well adapted for use in conjunction with two table machines whether the tables rotate in the same or opposite directions.

Modifications may be resorted to within the spirit and scope of the appended claims.

What I claim is:

1. In a glassware forming machine, a pair of mold carriages arranged side by side and rotatable about vertical axes, partible body blank molds on one of the mold carriages, partible finishing molds on the other mold carriage, partible neck molds individual to the body blank molds, means to form blanks in the neck and body blank molds, blank transfer devices individual to the molds, each transfer device comprising an arm mounted for horizontal swinging movement on the blank mold carriage, one of said neck molds carried by the arm, means to swing the arm and neck mold thereon in a horizontal plane entirely above the blank and finishing molds to alternately position the neck mold over the blank and finishing molds, and means to transfer the blanks from the neck mold to the finishing mold while they are in register with each other.

2. In a glassware forming machine, a blank mold carriage, partible blank molds thereon, a finishing mold carriage arranged at one side of the blank mold carriage, finishing molds on said finishing mold carriage, means to rotate said carriages about vertical axes and thereby bring the molds in succession to a blank transfer station between said carriages, blank transfer devices individual to the molds, each transfer device including a partible neck mold adapted to cooperate with the corresponding blank mold in forming a blank or parison, an arm pivoted to the blank mold carriage at one side of the blank mold, said neck mold supported on the arm, means to swing the arm in a horizontal plane to transfer a blank from the blank mold to one of the finishing molds, said neck mold mounted for relative horizontal sliding movement on the supporting arm whereby the neck mold may follow the path of travel of the finishing molds, and means to hold the neck and finishing molds together during the entire transfer operation.

3. In combination, an annular series of body blank molds rotatable about a vertical axis, an annular series of finishing molds rotatable about a vertical axis spaced horizontally from the body blank molds, blank transfer devices individual to the body blank molds and each including a neck mold, a supporting arm for the neck mold, said neck mold mounted for sliding movement in the direction of the length of said arm, means to swing the arm horizontally to thereby remove a blank from the body blank mold to a position in which it may be enclosed in a finishing mold, means to close a finishing mold about the blank, and a centering device individual to the finishing mold to cause movement of the neck mold relative to its supporting arm while the blank is being enclosed in the finishing mold whereby the neck mold follows the path of travel of the finishing mold a predetermined distance.

4. In a glassware forming machine, a blank mold carriage rotatable about a vertical axis, a partible body blank mold thereon, a finishing mold carriage rotatable about a vertical axis spaced from the blank mold table, a partible finishing mold on the finishing mold carriage, a partible neck mold adapted to cooperate with the body blank mold in forming a blank or parison, means to transfer a blank from the body blank mold to the finishing mold comprising an arm supporting the neck mold, means to swing the arm in a horizontal plane to cause register of the neck mold with a finishing mold, means whereby the neck mold may be moved in the direction of the length of the arm during swinging movement of the latter, and means to open and close the neck mold in alternation at regular time intervals.

5. In combination, an annular series of body blank molds rotatable about a vertical axis, partible neck molds individual thereto, an annular series of partible finishing molds rotatable about a vertical axis at one side of the body blank molds, said molds moving in succession past a transfer station between said series of molds, blank transfer devices individual to the blank molds and each including a neck mold supporting arm, connection between the neck mold and said arm whereby the mold may slide lengthwise of the arm, means to move the arm in a horizontal plane to position the neck mold over finishing and blank molds in alternation, means to close the finishing molds about a blank suspended from the neck mold, and means including grippers associated with the finishing mold to engage the neck mold and cause relative sliding movement between the neck mold and its supporting arm during closing of the finishing mold.

6. In combination, a partible blank mold, a partible finishing mold, means to rotate said molds in the same horizontal plane about horizontally spaced axes, a device for transferring blanks from the blank mold to the finishing mold, said device comprising a transfer arm, a blank support slidingly mounted on the arm for movement lengthwise of the latter, means to swing the arm in a horizontal plane during the transfer operation, and means associated with the finishing mold to at least in part cause movement of the blank support on said arm during a portion of the swinging movement of the latter.

7. In combination, a partible blank mold, a partible finishing mold spaced horizontally therefrom, means to rotate the molds about spaced vertical axes past a blank transfer station between said axes, blank transfer means comprising a transfer arm, a blank support slidingly mounted on the arm for movement lengthwise thereof, means to swing said arm about a vertical axis to thereby move the blank support from a position over the blank mold to a position above and in register with the finishing mold, means to close the finishing mold about the blank, means associated with the finishing mold to at least in part cause relative movement between the blank support and arm while the finishing mold is closing about the blank, and means to then release the blank from said blank support.

8. In a glassware forming machine, a blank mold carriage, partible blank and neck molds thereon, a finishing mold carriage arranged at one side of the blank mold carriage, partible finishing molds on the finishing mold carriage, means to continuously rotate said carriages and bring the mold in succession to a blank transfer station between said carriages, blank transfer devices individual to the blank molds, each transfer device including an arm supporting the corresponding neck mold, a connection between the neck mold and arm whereby the mold is free to slide horizontally on said arm, means to move the arm to a position in which the neck mold is above and in register with one of the finishing molds, and means to center the neck mold over the finishing mold during at least a portion of the transfer operation.

9. In combination, a body blank mold, a finishing mold spaced horizontally therefrom, means to rotate the molds about vertical axes spaced horizontally from each other to thereby move said molds past a blank transfer station at regular time intervals, a blank transfer device comprising an arm mounted to swing in a horizontal plane, a neck mold mounted for sliding movement along said arm, means for swinging the arm to alternately position the neck mold over and in register with the blank and finishing molds, means to cause a relative horizontal movement between the neck mold and arm while the former is positioned over the finishing mold to move the neck mold in the arc of movement of the finishing mold, and means to transfer a blank from the neck mold to the finishing mold while said molds are in register with each other.

10. In combination, a body blank mold, a finishing mold spaced horizontally therefrom, means to rotate the molds about vertical axes spaced horizontally from each other to thereby move said molds past a blank transfer station at regular time intervals, a blank transfer device comprising an arm mounted to swing in a horizontal plane, a neck mold mounted for sliding movement along said arm, means for swinging the arm to alternately position the neck mold over and in register with the blank and finishing molds, means to cause a relative horizontal movement between the neck mold and arm while the former is positioned over the finishing mold to move the neck mold in the arc of movement of the finishing mold, means to transfer a blank from the neck mold to the finishing mold while said molds are in register with each other, and means to cause reverse movement of the neck mold relative to said arm after completion of the blank transfer operation.

11. In combination, a blank mold, a finishing mold spaced horizontally from the blank mold, means to rotate said molds about vertical axes and thereby move them past a blank transfer station, a blank transfer mechanism comprising a blank engaging device, a supporting arm for the device, said device mounted for sliding movement lengthwise of the supporting arm, means to swing the arm about a vertical axis to alternately position said blank engaging device over and in register with the blank and finishing molds, means to secure said device and finishing mold together at times whereby the device moves relative to the arm and with the finishing mold during at least part of the transfer operation, and means for transferring a blank from the blank engaging device to the finishing mold.

12. In a glassware forming machine, a blank mold carriage rotatable about a vertical axis past charge gathering and blank transfer stations, a partible body blank mold on the carriage, a neck mold adapted to cooperate with the body blank mold in forming a blank, means to move said molds vertically as a unit at the charge gathering station, means to swing the neck mold independently of the body blank mold in a horizontal plane entirely above the blank and finishing molds at the blank transfer station to carry a bare blank to a position radially beyond the path of travel of the body blank mold, and a finishing mold adapted to enclose said blank preparatory to final expansion thereof.

13. In a glassware forming machine, an annular series of partible body blank molds rotatable about a vertical axis, an annular series of partible finishing molds spaced horizontally from the body blank molds and rotatable about a vertical axis, said molds brought in succession by rotation thereof to a blank transfer station substantially between said vertical axes, neck molds individual to the body blank molds adapted to cooperate therewith in forming blanks or parisons, means to move the neck molds in a horizontal plane entirely above the blank and finishing molds away from the body blank molds at the transfer station to positions over and in register with the finishing molds, means to close the finishing molds, and devices to secure the neck and finishing molds together during the transfer operation.

14. In combination, blank and finishing mold tables arranged side by side, means to continuously rotate the carriages about vertical axes, finishing molds on one table, neck and body blank molds on the other table, devices individual to the molds to transfer blanks from the body blank molds to the finishing molds, each transfer device including an arm pivoted to the blank mold table for swinging movement in a horizontal plane, said arm supporting and having sliding connection with a neck mold, yielding means normally holding the neck mold in a predetermined position on said arm, means to swing the arm to thereby cause register of the neck mold with a finishing mold, and means associated with each finishing mold to center the neck mold over the latter and cause relative movement between said neck mold and arm during at least a portion of the blank transfer operation.

15. In combination, blank and finishing mold tables arranged side by side and rotatable about vertical axes, partible neck and body blank molds on the blank mold table, partible finishing molds on the finishing mold table, means to form blanks in the neck and body blank molds, means to move the neck molds horizontally at a blank transfer station to positions over and in register with the finishing molds, and devices individual to the finishing molds to engage the neck molds and hold them in register with and over the finishing molds and cause the neck molds to move in the arc of travel of the finishing molds during at least a part of the blank transfer operation.

16. In combination, blank and finishing mold tables arranged side by side and rotatable about vertical axes, partible neck and body blank molds on the blank mold table, partible finishing molds on the finishing mold table, means to form blanks in the neck and body blank molds, means to move the neck molds horizontally at a blank transfer station to positions over and in register with the finishing molds, devices individual to the finishing molds to engage the neck molds and hold them in register with and over the finishing molds and cause the neck molds to move in the arc of travel of the finishing molds during at least a part of the blank transfer operation, the means for moving the neck mold horizontally including an arm pivoted to the blank mold table, for horizontal swinging movement, and cam controlled mechanism for swinging said arm.

17. In combination, blank and finishing mold tables arranged side by side and rotatable about vertical axes, partible neck and body blank molds on the blank mold table, partible finishing molds on the finishing mold table, means to form blanks in the neck and body blank molds, means to move the neck molds horizontally at a blank transfer station to positions over and in register with the finishing molds, and devices individual to the finishing molds to center the neck molds over the finishing molds and cause the neck molds to move in the arc of travel of the finishing molds during at least a part of the blank transfer operation, the means for moving each neck mold including an arm pivoted to the blank mold table for swinging movement in a horizontal plane, said arm supporting the neck mold and having sliding connection thereto.

18. In a glassware forming machine, a blank mold carriage rotatable about a vertical axis past charge gathering and blank transfer stations, a partible body blank mold on the carriage, a neck mold adapted to cooperate with the body blank mold in forming a blank, means to move said molds vertically as a unit at the charge gathering station, means to swing the neck mold independently of the body blank mold about a vertical axis at the blank transfer station to carry a bare blank to a position radially beyond the path of travel of the body blank mold, a finishing mold adapted to enclose said blank preparatory to final expansion thereof, and means associated with the finishing mold to hold the neck mold over and in register with the finishing mold during the blank transfer operation.

19. In combination, a pair of blank and finishing mold tables arranged side by side and rotatable about vertical axes, blank molds on one table, finishing molds on the other table, means to form blanks in the blank molds, blank transfer mechanism individual to the molds for transferring blanks to the finishing molds, each transfer mechanism including a horizontally swinging arm mounted on the blank mold table, a blank support carried by each arm and movable lengthwise thereof, means to swing the arm to place the blank support over and in register with a finishing mold, means to secure said support in position over the finishing mold during the transfer operation and thereby cause relative movement between said support and arm, means to close the finishing mold about the blank, and means to then remove the blank support from engagement with the blank.

20. In combination, blank and finishing mold tables arranged side by side and rotatable about vertical axes, annular series of body blank and finishing molds arranged on the blank and finishing mold tables respectively, partible neck molds individual to the body blank molds, neck mold supporting arms pivoted to the blank mold table between the body blank molds, each arm including a slideway extending lengthwise thereof, a slide mounted in the slideway and supporting a neck mold, yielding means normally holding the slide and neck mold at the outer end of the arm, means to swing the arm to position the neck mold over and in register with a finishing mold, and means to transfer a blank from the neck mold to the finishing mold.

21. The combination of a blank mold, a finishing mold comprising separable sections, a carriage on which the finishing mold is supported, a transfer device mounted separately from said carriage, means for operating said transfer device to carry a parison from the blank mold to the open finishing mold, a centering device mounted on said carriage, means for causing the centering device to hold the transfer device in a fixed position relative to the carriage, and means for closing the finishing mold about the parison while the transfer device is so held.

22. The combination of a blank mold, a finishing mold comprising sections to swing to open and closed positions, means for forming a parison of glass in the blank mold, a transfer device operable to transfer the parison from the blank mold to the finishing mold, a centering device comprising gripping members mounted for pivotal movement coaxially with the pivoted movement of the finishing mold sections, means for operating said gripping members to grip the transfer device, and means for closing the finishing mold around the parison while the transfer device is held by the centering device.

23. The combination of a blank mold, a neck mold in register therewith, a finishing mold, each of said molds comprising separable sections, means cooperating with the blank and neck molds for forming a parison therein, means for opening the blank mold and leaving a parison suspended from the neck mold, means for shifting the neck mold horizontally with the parison suspended therefrom for transferring the parison to a position in register with the finishing mold, a centering device operable to engage the neck mold and hold it in its shifted position, and means for then closing the finishing mold around the parison.

24. The combination of a blank mold, a neck mold in register therewith, a finishing mold, each of said molds comprising separable sections, means cooperating with the blank and neck molds for forming the parison therein, means for opening the blank mold and leaving the parison supported in the neck mold, means for shifting the neck mold and parison supported thereby in a horizontal plane entirely above the blank and finishing molds for placing the parison in position to be enclosed in the finishing mold, a parison centering device comprising a pair of pivoted gripping jaws arranged above the finishing mold and operable to close about the neck mold at times and hold it in register with said finishing mold, means for operating the jaws, and means for closing the finishing mold about the parison.

Signed at Toledo, Ohio, this 11th day of September, 1929.

JOHN RALPH HOGE.